(12) United States Patent
Yeap et al.

(10) Patent No.: US 11,640,514 B2
(45) Date of Patent: May 2, 2023

(54) CHIP CARD, ANTENNA SUPPORT FOR A CHIP CARD AND METHOD FOR MANUFACTURING AN ANTENNA SUPPORT FOR A CHIP CARD

(71) Applicant: Linxens Holding, Mantes-la-Jolie (FR)

(72) Inventors: Yean Wei Yeap, Singapore (SG); Minli Cindy Ng, Singapore (SG); Wen Qiang Chin, Singapore (SG)

(73) Assignee: Linxens Holding, Mantes-la-Jolie (FR)

( * ) Notice: Subject to any disclaimer, the term of this patent is extended or adjusted under 35 U.S.C. 154(b) by 0 days.

(21) Appl. No.: 17/418,905

(22) PCT Filed: Jan. 31, 2019

(86) PCT No.: PCT/IB2019/000136
§ 371 (c)(1),
(2) Date: Jun. 28, 2021

(87) PCT Pub. No.: WO2020/157534
PCT Pub. Date: Aug. 6, 2020

(65) Prior Publication Data
US 2022/0114411 A1      Apr. 14, 2022

(51) Int. Cl.
*G06K 19/077*      (2006.01)
*G06K 19/07*      (2006.01)
(Continued)

(52) U.S. Cl.
CPC ... *G06K 19/07794* (2013.01); *G06K 19/0726* (2013.01); *G06K 19/07788* (2013.01);
(Continued)

(58) Field of Classification Search
CPC ......... G06K 19/07794; G06K 19/0726; G06K 19/07788; G06K 7/10297; G06K 19/07722; G06K 19/07781; H01Q 1/2208
See application file for complete search history.

(56) References Cited

U.S. PATENT DOCUMENTS 8,749,390 B2 *   6/2014   Eray ........................ H01Q 7/00
                                                             343/742
10,235,543 B2 *   3/2019   Pachler .............. G06K 7/10336
(Continued)

FOREIGN PATENT DOCUMENTS

DE    10 2012 109 359 A1    4/2014
WO    WO 2015/082781 A1     6/2015

OTHER PUBLICATIONS

English translation WO2017153644 (Year: 2017).*

*Primary Examiner* — Thien M Le
*Assistant Examiner* — Asifa Habib
(74) *Attorney, Agent, or Firm* — Harrington & Smith

(57) ABSTRACT

The invention relates to a chip card designed to communicate data in a contactless mode with a card reader operating at a reading frequency. The resonance frequency of the chip card may change according to the capacitance of the chip used in the contactless mode of the chip card. In order to be able to use various chips without changing the booster antenna design, the card antenna circuit is provided with a capacitance element such that the chip card including the card antenna circuit and the chip module has two different resonance frequencies, one of which being equal to, or lower than, the reading frequency and the other being equal to, or greater, than the reading frequency. This create a broadband wherein the reading frequency falls.

20 Claims, 5 Drawing Sheets

(51) Int. Cl.
*H01Q 1/22* (2006.01)
*G06K 7/10* (2006.01)

(52) U.S. Cl.
CPC ....... *H01Q 1/2208* (2013.01); *G06K 7/10297* (2013.01); *G06K 19/07722* (2013.01); *G06K 19/07781* (2013.01)

(56) References Cited

U.S. PATENT DOCUMENTS

| | | | |
|---|---|---|---|
| 10,586,142 B2 * | 3/2020 | Danler-Baumgartner | ................... G06K 19/07318 |
| 2014/0158775 A1 * | 6/2014 | Hofer | ............... G06K 19/07794 235/492 |
| 2014/0246504 A1 * | 9/2014 | Ikemoto | ........... G06K 19/07794 235/492 |
| 2015/0021402 A1 * | 1/2015 | Finn | ......................... H01Q 7/00 235/492 |
| 2015/0269477 A1 | 9/2015 | Finn et al. | |
| 2016/0188926 A1 * | 6/2016 | Pachler | .............. G06K 7/10336 235/487 |
| 2018/0113512 A1 * | 4/2018 | Kang | ................. G06F 3/04817 |
| 2019/0102663 A1 * | 4/2019 | Danler-Baumgartner | ................... G06K 19/07336 |
| 2021/0081748 A1 * | 3/2021 | Finn | ................. G06K 19/07722 |

* cited by examiner

CHIP CARD, ANTENNA SUPPORT FOR A CHIP CARD AND METHOD FOR MANUFACTURING AN ANTENNA SUPPORT FOR A CHIP CARD

CROSS REFERENCE TO RELATED APPLICATION

This patent application is a U.S. National Stage application of International Patent Application Number PCT/IB2019/000136 filed Jan. 31, 2019, which is hereby incorporated by reference in its entirety.

The invention relates to the field of chip cards, also called smartcard. Chip cards are well known to the public, who have multiple uses therefor: payment cards, transport cards, identity cards, etc.

The chip cards comprise transmission means for transmitting data from an electronic chip (integrated circuit) to a card reader device (reading), or from this device to the card (writing). These transmission means can be "with contact", "contactless" or else "dual-interface", when they combine the above two means.

As shown on FIG. 1, the chip cards 1 generally consist of a rigid card body 2 made of plastic material of PVC, PVC/ABS, PET or polycarbonate type forming most of the card, in which an electronic module 3 is incorporated. The electronic module 3 generally comprises a flexible printed circuit provided with an electronic chip. In chip cards with contacts and dual interface cards, the electronic module comprises contact lands electrically connected to bonding pads of the chip. The contact lands sit flush on the electronic module, on the surface of the card body, for a connection by electrical contact with a card reader device. Contactless chip cards and dual-interface chip cards further comprise at least one antenna for transmitting data between the chip and a radiofrequency system allowing data to be contactlessly read or written.

There are contactless chip cards and dual-interface chip cards having an antenna in the card body which is directly electrically connected to the electronic module. There are also contactless chip cards and dual-interface chip cards having an antenna inserted within layers of the card body which is inductively coupled with a coupler coil located in the electronic module. In such cards, the antenna inserted in the card body are named "booster antenna".

The invention relates to contactless chip cards and dual-interface chip cards with booster antenna. In such cards, the electronic module comprises a module antenna and the electronic module is accommodated in a cavity (for instance cut or milled in the layers of the card body) so as to be efficiently inductively coupled to the coupler coil located in the card body. An example of electronic module with a coupler coil is described for example in the patent document FR2994005B1.

One of the technical problems one encounters, when designing a chip card with a booster antenna, relates to obtaining a resonance frequency of the booster antenna which is in the frequency range set by standards for data communication between the chip in the electronic module and a contactless card reader. For instance, the resonance frequency shall be between 13 HHz and 15 MHz.

The resonance frequency of the card antenna circuits is dependant of parameters such as chip impedance, as well as the impedances of the various antennas or parts of antennas (module antenna, coupler coil and booster antenna). For example, the chips may have a capacitance ranging from 40 picofarads to 100 picofarads. Changing the chip usually leads to a resonance frequency shift that could prevent an efficient coupling of card antenna circuits with the card reader. Consequently, when the chip is changed, it is usually needed to adapt and to redesign the card antenna circuit. It would then be suitable to have a resonance frequency within a relatively broadband in order to meet interoperability requirements and to be able to use various chips without changing the design of the card antenna circuits.

Further, designing a chip card with a booster antenna shall address other challenges relating to the card dimensions, the position of the electronic module as set by standards, area of the card which has to be let free because of possible embossment of the card body, etc.

The invention aims at contributing at least partially to the improvement of chip cards with a booster antenna and proposes a chip card according to claim 1.

Thanks to the invention, the bandwidth of the frequency response of the card antenna circuits is broaden and the reading frequency of the card reader is comprised in this bandwidth. Furthermore, the bandwidth of the frequency response of the card antenna circuits does not shift completely out of the reading frequency range when the chip module is placed in its cavity. Indeed, thanks to the capacitance element of the card antenna circuit, the frequency response of the card antenna circuit becomes less sensitive to the value of the chip capacitance.

The chip card may possibly have one or several features mentioned in claims 2 to 17, considered alone or in combination with one or more other features.

The invention also relates to an antenna support for a chip card according to claim 18, as well as a process according to claims 19 to 21.

Other features and advantages of the invention will become apparent on reading the following detailed description, and in the attached drawings. In these drawings:

FIG. 1 schematically represents, in perspective, an embodiment of a chip card according to the invention;

FIG. 2 schematically represents, in perspective and in an exploded view, the embodiment of the chip card represented on FIG. 1;

FIG. 3 schematically represents an embodiment of an antenna support that can be inserted between layers of the chip card represented in FIGS. 1 and 2;

Figure 1:
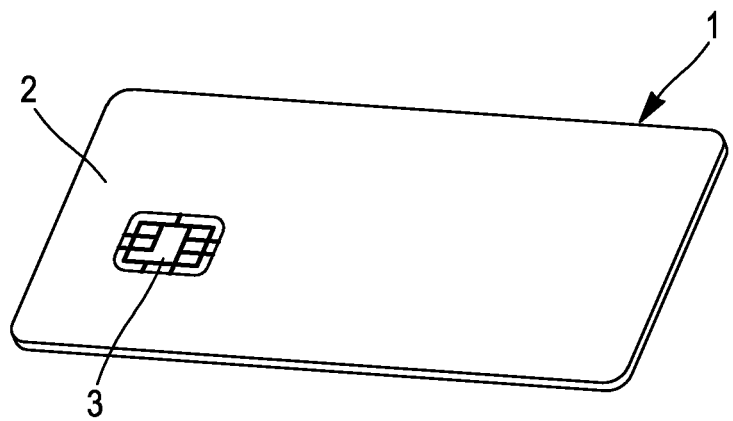
Figure 2:
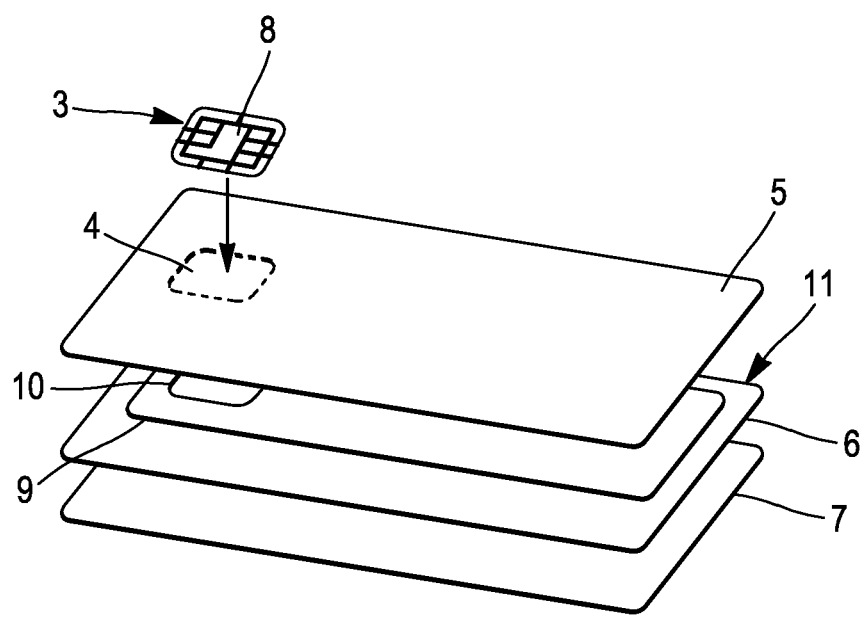
Figure 3:
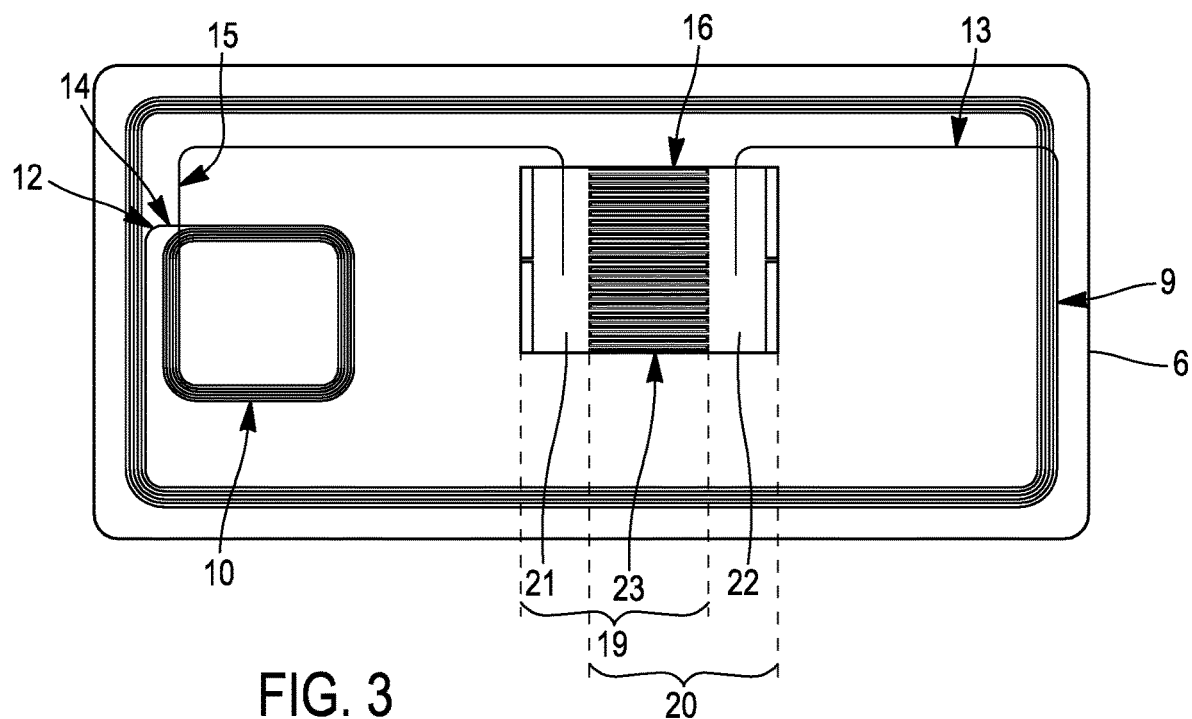
Figure 4:
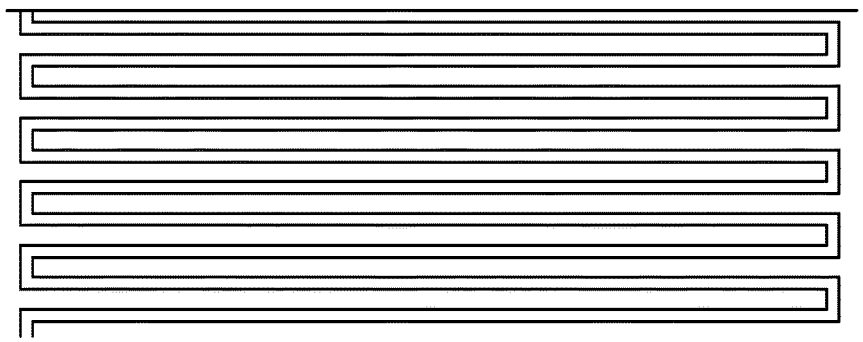
FIG. 4 is an enlargement of a region of the capacitance element of the antenna support represented on FIG. 3.
Figure 5:
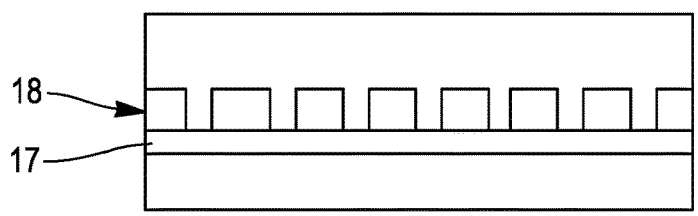
FIG. 5 is an enlarged cross-section of a region of the capacitance element of the antenna support represented on FIG. 3.
Figure 8:
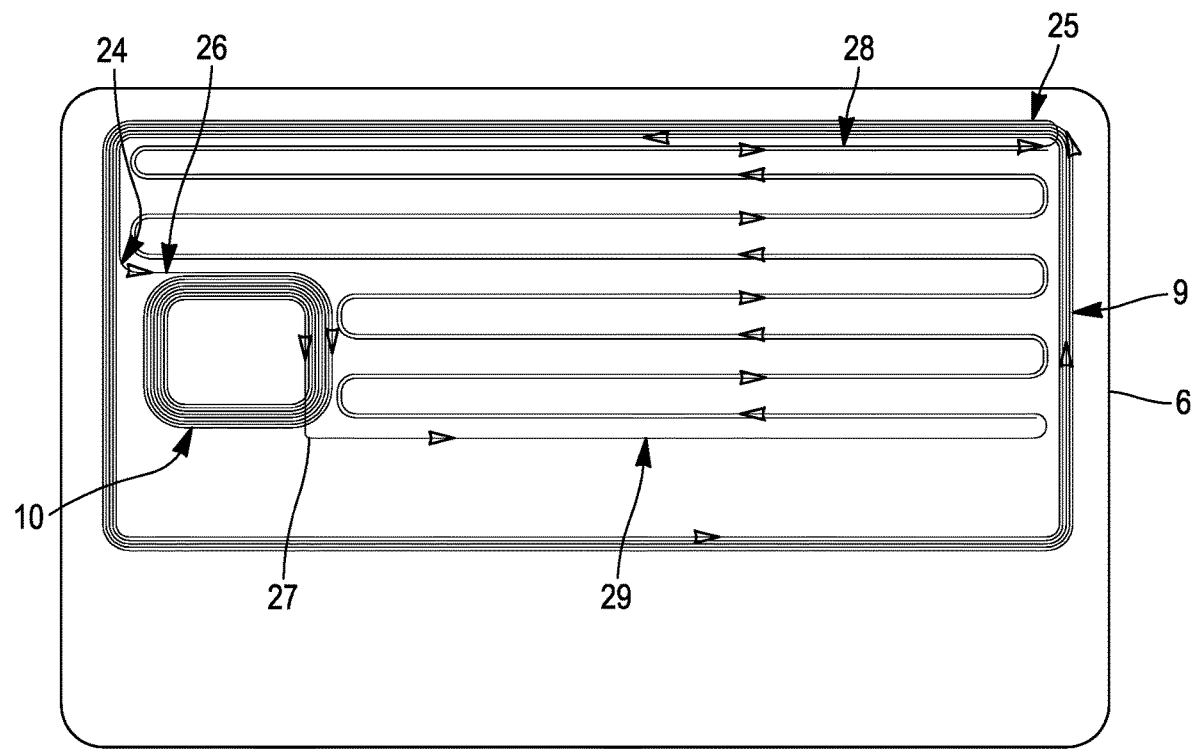
Figure 9:
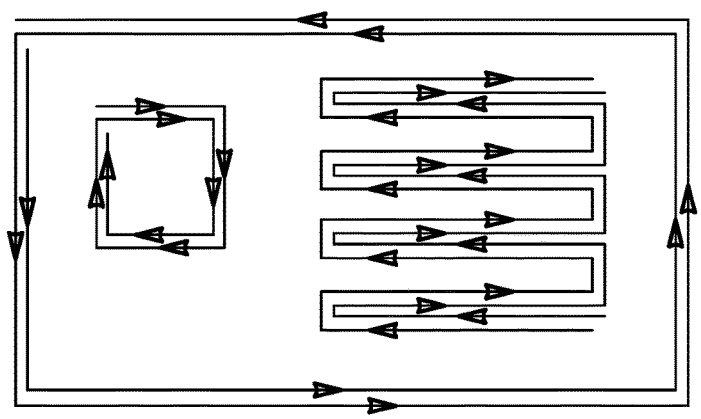
Figure 10:
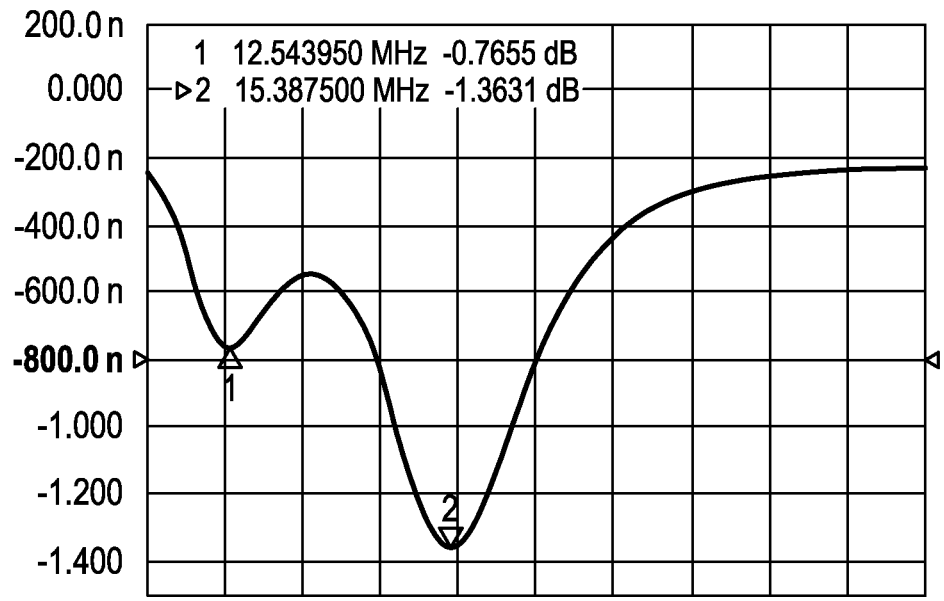
Figure 11:
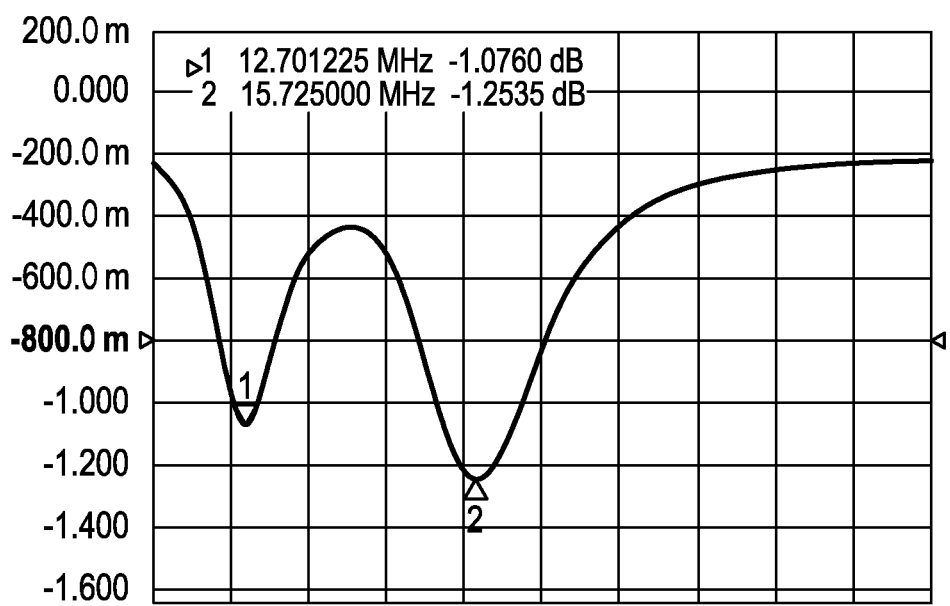

FIG. 8 schematically represents, another embodiment of an antenna support that can be inserted between layers of the chip card represented in FIGS. 1 and 2;

FIG. 9 schematically represents the direction of the electrical current that flows respectively in the booster antenna, the coupler coil and the capacitance element, in the embodiment of the antenna support represented on FIG. 8;

FIGS. 10 and 11 represent, respectively for two different chips, the frequency response waveform of a chip card according to the embodiment corresponding to FIGS. 3 to 5;

In this document, the terms "front", "rear", "above", "below", "upper", lower", etc. are purely conventional and, as appropriate, refer to the orientations as represented in the figures.

FIGS. 1 and 2 show a first exemplary embodiment of a chip card 1 according to the invention. This chip card 1 comprises a card body 2, and an electrical module 3. One shall note that one or several layer(s) or sheet(s) can be laminated, in addition to those represented, above and/or below their main faces.

The electronic module 3 is for example of bank type and corresponds to the ISO 7816 standard. The electronic module 3 is accommodated in a cavity 4 produced in the card body 2 (see FIG. 2). The cavity 4 can be milled from one of the main faces of the card body 2 after the latter has been produced by lamination of several sheets 5, 6, 7 of plastic material. Alternatively, the cavity 4 is cut out from a sheet 5 of plastic material before the latter is laminated with other sheets 6, 7 of plastic material to form the card body 2.

The electronic module 3 is made according to the prior art (see for instance the patent document FR2994005A1). The chip mounted in the module has, for example, a capacitance ranging from 40 to 100 picofarads. For example, as shown below tests were performed with chips having a capacitance of 69 and 78 picofarads respectively.

The card represented in FIGS. 1 and 2 is of the dual-interface type. The electronic chip of the module 3 is connected both to the contact lands 8 on the front face of the module 3, which are flush with the surface of the card 1, and to a module antenna (not represented, but which lies on the rear face of the module 3, opposite the front or contact face of the module 3). It can operate in "contact" or in "contactless" mode. The chip module 3 may comprise six or eight contact lands 8.

The card represented on FIGS. 1 and 2 comprises at least one bottom sheet 7, one intermediate sheet 6 forming an antenna support or antenna inlay, and one top sheet 5. As already mentioned, each of these three sheets 5, 6, 7 may possibly be composed of several sublayers (for example, the top 5 and bottom 7 sheets may comprise a finishing layer, a printing layer, etc.).

The top 5 and bottom 7 sheets are, for example, composed of one or more layers of PVC. The antenna support 6 is composed of one or more layers on, or between, which there is incorporated a booster antenna 9 which consists in a wired coil with at least one winding. Alternatively, the booster antenna 9 may consists in a coil made of a conductive track etched in a metallic sheet and forming at least one winding. The booster antenna 9 takes up a large area of the antenna support 6. The winding(s) of the booster antenna 9 may have an essentially rectangular shape with sides running close to the chip card edges 11. One or more different constituent layers of the antenna support 6 are for example also produced in a PVC sheet 210 to 240 micrometers thick.

A coupler coil 10 is also supported by the antenna support 6. The coupler coil 10 is advantageously produced at the same time and with the same technology (e.g. wire embedding or electrochemical etching) as the booster antenna 9.

FIG. 3 represents a particular embodiment of the antenna support 6 according to the invention. It comprises a substrate having two main surfaces. In FIG. 3, the antenna support 6 is viewed from above one of its main surfaces. This antenna support 6 is made of PVC. It has an essentially rectangular shape corresponding to ISO/IEC 7810 ID-1 format. A booster antenna 9 and a coupler coil 10 are comprised of a single wire of electrically conductive material (e.g. copper or aluminum alloy, of 80 to 112 micrometers in diameter), which is embedded in the antenna support 6 according to a method known from the person skilled in the art (see for instance the patent document EP0753180A1).

The booster antenna 9 comprises about six windings between a first end 12 and a second end 13. For example, the booster antenna wire starts from the first end 12 and runs (counterclockwise on FIG. 3) along an essentially rectangular shape having two long sides essentially parallel to the longest sides of the antenna support 6 and two short sides essentially parallel to the shortest sides of the antenna support 6. This rectangular shape covers about the two upper thirds of the width of the antenna support 6 and almost the whole length of the antenna support 6, so as to leave one third of the surface of the antenna support 6, at the bottom of the antenna support 6, for a possible embossment. Starting from the first end 12, the first winding corresponds to an inner winding (i.e. wound inwardly of the other windings).

The coupler coil 10 comprises about six windings between a third end 14 and a fourth end 15, the third end 14 being connected to the first end 12 of the booster antenna 9. The number of windings of the coupler coil 10 may vary depending, for example on the kind of chip module 3. The number of windings may vary, for example from four to eight. For instance, for a chip module 3 with eight contact lands (also called 8-pins module), the number of windings may be six. For a chip module 3 with six contact lands (also called 6-pins module), the number of windings may be more.

The coupler coil 10 has essentially a square shape with four sides which surround an area corresponding to the cavity for the electronic module 3. The coupler coil 10 is wound counterclockwise from the fourth end 15 to the third end 14. Starting from the fourth end 15, the first winding corresponds to an inner winding (i.e. wound inwardly with respect to the other windings).

The capacitance element 16 comprises a substrate 17 made of a dielectric material (see FIG. 5) and an electrically conductive layer 18 lying on the substrate 17. For instance, the substrate 17 is comprised of epoxy-glass, or PET, or PVC, etc. The thickness of the substrate 17 ranges from 50 to 120 microns. For instance, the electrically conductive layer 18 is comprised of copper alloy, or aluminum alloy, or silver ink, or carbon nanoparticles, etc. The thickness of the conductive layer 18 ranges from 5 to 50 microns, and is preferably equal to 30 microns.

The capacitance element 16 comprises two regions 19, 20 electrically isolated from one another. Each region 19 or 20 comprises a conductive pad 21 or 22 and a series of fingers 23 (for instance, a series of 20 fingers). For example, each finger is 10 millimeters long and 250 microns wide. The fingers of each of the regions are spaced from 50 to 150 microns apart (see FIG. 5). The fingers of these two regions are interdigitated. In other words, fingers of each one of the two regions are arranged head to foot with fingers of the other region. Fingers of a region are bordered on both sides, longitudinally by fingers of the other region, with a gap between them from 50 to 150 microns wide. The longer the fingers are, the higher the capacitance value is. The more fingers there are, the higher the capacitance value is.

The capacitance element 16 is attached to the antenna support 6. For example, the capacitance element 16 is glued onto the antenna support 6 or laminated with the antenna support 6. Such a solution has the advantage that the antenna support 6 can be manufactured with a booster antenna 9 and a coupler coil 10 having parameters (wire diameter, number of windings, etc.) which are the same for various chips and various applications, the capacitance element 6 being possibly the only part which can be designed and adapted (number, length, width, thickness, etc. of fingers, as well as the gap between the fingers), for optimizing the coupling between a particular chip module 3 and card readers and/or for meeting particular specifications.

The second end 13 of the booster antenna 9 is electrically connected to one conductive pad 22 of the capacitance element 16 and the fourth end 15 of the coupler coil is electrically connected to the other conductive pad 21 of the capacitance element 16. The electrical connection between the wire ends 13, 15 and the conductive pads 21, 22 of the capacitance element 16 is for instance made by thermocompression or ultrasonic bonding.

Figure 6:
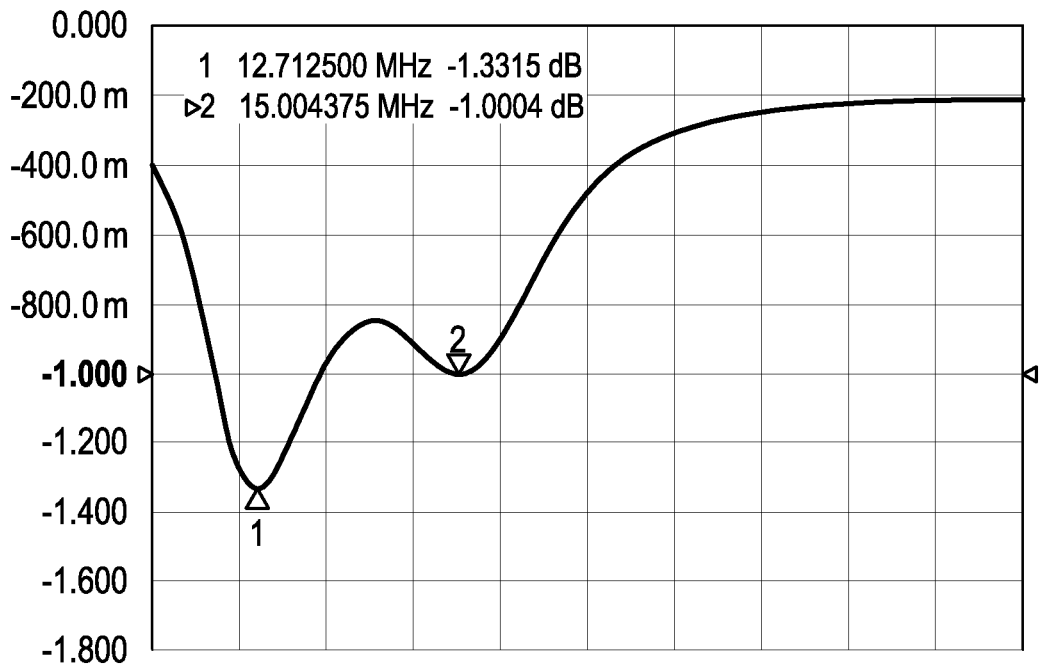
FIGS. 6 and 7 represent, respectively for two different chips, the frequency response waveform of a chip card according to the embodiment corresponding to FIGS. 3 to 5.
Figure 7:
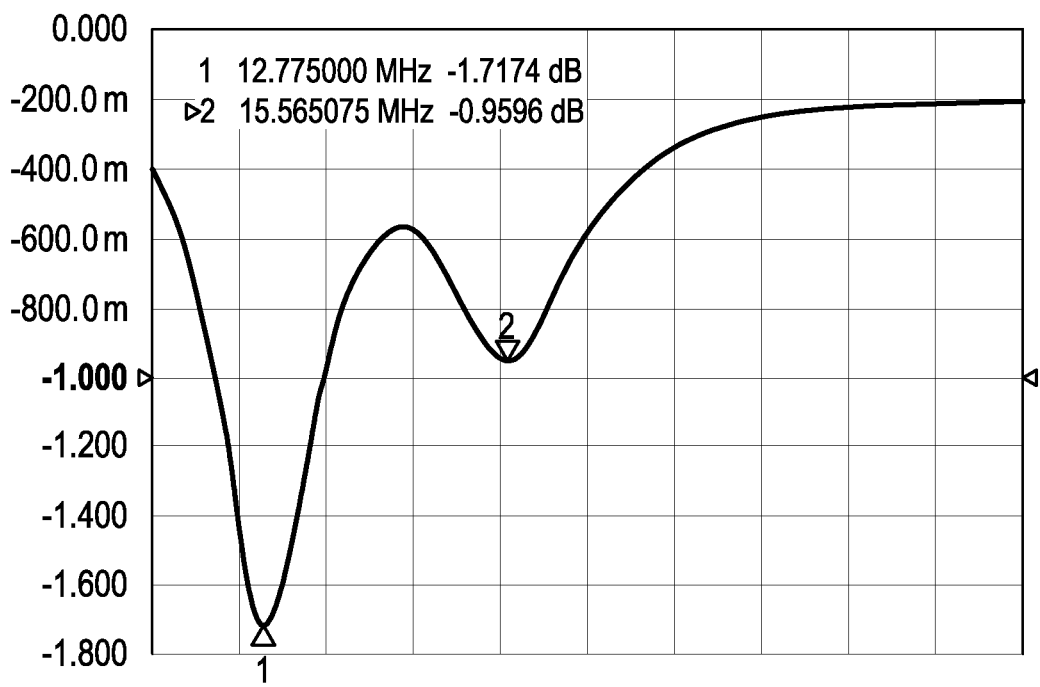

FIGS. 6 and 7 show the amplitude of the signal measured in the reflection mode (S11) versus frequencies for two different chips (respectively Infineon SLE78—and NXP P60). These curves show two dips included in a relatively large bandwidth. More particularly, the curve of FIG. 6 shows two dips at respectively at 12.7 and 15.0 Mhz. The bandwidth between these two dips is about 2.3 MHz wide. The capacitance of the chip corresponding to the measurements of FIG. 6 is 78 picofarads. The curve of FIG. 7 shows two dips at respectively at 12.7 and 15.6 Mhz. The bandwidth between these two dips is about 2.9 MHz wide. The capacitance of the chip corresponding to the measurements of FIG. 7 is 60 picofarads.

The reading frequency of the card reader is about 13.5 MHz. One can see that this reading frequency is about in the middle of the bandwidths respectively obtained for two different values of chip capacitance. This demonstrate the interoperability capabilities of the antenna circuit shown in FIG. 3. Further, even in the event of a de-tuning of the card frequency, a broad band response may allow a detection and a reading by card readers.

FIG. 8 represents another particular embodiment of the antenna support 6 according to the invention. It comprises a substrate having two main surfaces. On FIG. 8, the antenna support 6 is viewed from above one of its main faces. This antenna support 6 can be similar to the one already described in connection with the previous embodiment and its description will not be repeated for the sake of conciseness.

The booster antenna 9 comprises about five windings between a first end 24 and a second end 25. For example, this wire starts from the second end 25 and runs (counterclockwise on FIG. 8) along an essentially rectangular shape having two long sides essentially parallel to the longest sides of the antenna support 6 and two short sides essentially parallel to the shortest sides of the antenna support 6. This rectangular shape covers about the two upper thirds of the width of the antenna support 6 and almost the whole length of the antenna support 6, so as to leave one third of the surface of the antenna support, at the bottom of the antenna support 6, for a possible embossment. Starting from the second end 25 the first winding corresponds to an outer winding (i.e. wound outwardly of the other windings).

The coupler coil 10 comprises about eight to nine windings (and more generally, from four to eight windings depending for example of the kind of chip module—6 or 8 pins, as already explained) between a third end 26 and a fourth end 27, the third end 26 being connected to the first end 24 of the booster antenna 9. The coupler coil 10 has essentially a square shape with four sides which surround an area corresponding to the cavity for the electronic module 3. The coupler coil 10 is wound clockwise from the third end 26 to the fourth end 27. Starting from the third end 26, the first winding corresponds to an outer winding (i.e. wound outwardly with respect to the other windings).

The capacitance element 16 comprises two wire ends 28, 29 being a part of the wire from which are made the booster antenna 9 and the coupler coil 10. One wire end 28 extends from the booster antenna 9 beyond the second end 25 and the other wire end 29 extends from the coupler coil 10 beyond the fourth end 27. Both these wire ends 28, 29 are interleaved but are left unconnected in the region of the capacitance element 16. They are arranged so that one wire end starts in the vicinity of the free end of the other wire end and reciprocally. In between, these two wires ends 28, 29 form parallel meanders where they are substantially parallel to one another. There are two meanders extending substantially between the two shortest sides of the booster antenna. They are about from 74 to 78 millimeters length. There are two meanders extending substantially between the coupler coil and one of the shortest sides of the booster antenna. They are about 58 millimeters length. Each meander has two sides which are about 260 microns spaced apart.

The second end 25 of the booster antenna 9 is electrically connected to one wire end 28 of the capacitance element 16 and the fourth end 27 of the coupler coil 10 is electrically connected to the other wire end 29 of the capacitance element 16.

As shown in FIG. 9, the windings of the booster antenna are wound in the same direction (e.g. counterclockwise). The windings of the coupler coil are also wound in the same direction but in opposite direction compared to the booster antenna (e.g. clockwise). In the capacitance element the wire ends are wired in the same direction.

FIGS. 10 and 11 show the amplitude of the signal measured in the reflection mode (S11) versus frequencies respectively for two different chips (respectively Infineon SLE78 and NXP P60).

These curves show two dips included in a relatively large bandwidth. More particularly, the curve of FIG. 10 shows two dips at respectively at 12.5 and 15.4 Mhz. The bandwidth between these two dips is about 2.9 MHz wide. The capacitance of the chip corresponding to the measurements of FIG. 10 is 78 picofarads. The curve of FIG. 11 shows two dips at respectively at 12.7 and 15.7 Mhz. The bandwidth between these two dips is about 3.0 MHz wide. The capacitance of the chip corresponding to the measurements of FIG. 11 is 60 picofarads.

The reading frequency of the card reader is about 13.5 MHz. One can see that this reading frequency is about in the middle of the bandwidths respectively obtained for two different values of chip capacitance. This demonstrate the interoperability capabilities of the antenna circuit shown in FIG. 8. Further, even in the event of a de-tuning of the card frequency, a broad band response may allow a detection and a reading by card readers.

An advantage of this embodiment is that the booster antenna 9, the coupler coil 10 and the capacitance element 16 can be made by wire embedding, in one continuous step.

The invention claimed is:

1. A chip card designed to communicate data in a contactless mode with a card reader operating at a reading frequency of about 13.5 MHz, said chip card comprising:
   a card body;
   a chip module with a chip and a module antenna, the chip module being accommodated in a cavity made in the card body,
   a card antenna comprising a booster antenna lying on a dielectric layer which is integrated in the card body, and a coupler coil connected in series with the booster antenna, the coupler coil being inductively coupled to the module antenna,
   a capacitance element connected to the card antenna,
   wherein an assembly comprising the capacitance element and the card antenna is configured so as to have a first resonance frequency, wherein said chip card comprising the card antenna, the capacitance element and the chip module is configured so as to have a second resonance frequency and a third resonance frequency, the second resonance frequency being lower than a reading frequency and the third resonance frequency being greater than said reading frequency, where a width of a band of frequencies between said second resonance frequency and said third resonance frequency being equal or greater than about 2 MHz.

2. A chip card according to claim 1, wherein the second and third resonance frequencies are lower than said first frequency.

3. A chip card according to claim 1, wherein the capacitance element has a capacitance value comprised between 10 to 30 picofarads.

4. A chip card according to claim 1, wherein the booster antenna lies on an antenna support comprising two main surfaces, the booster antenna comprising at least one electrically conductive winding disposed on at least one main surface support and extending between a first end and a second end, the coupler coil comprising at least one electrically conductive winding disposed on at least one main surface of the support and extending between a third end and a fourth end, the third end being connected to the first end of the booster antenna, the capacitance element comprising at least a first finger and at least a second finger, the first and second fingers extending from a foot to a tip, head-to-foot, alongside each other, and the second end of the booster antenna and the fourth end of the coupler coil being connected respectively to one of the first and second fingers.

5. A chip card according to claim 4, wherein the capacitance element comprises two regions made of a conductive material, the two regions being electrically isolated from one another, each region comprising, on the one hand, a conductive pad connected to either said second end or said fourth end, and on the other hand, one of the first and second fingers.

6. A chip card according to claim 5, wherein at least one of the two regions comprises a plurality of fingers.

7. A chip card according to claim 5, wherein the two regions comprise a plurality of fingers interdigitated.

8. A chip card according to claim 5, wherein the capacitance element comprises a substrate made of a dielectric material and an electrically conductive layer lying on the substrate, the two regions made of a conductive material being made in the electrically conductive layer and the substrate lying on the antenna support.

9. A chip card according to claim 8, wherein the two regions made of a conductive material are etched in the electrically conductive layer.

10. A chip card according to claim 1, wherein the booster antenna and the coupler coil are comprised of an electrically conductive wire embedded in the antenna support, and the capacitance element comprises two regions made of a conductive material etched in an electrically conductive layer.

11. A chip card according to claim 1, wherein the booster antenna, the coupler coil and the capacitance element are comprised of an electrically conductive wire embedded in the antenna support.

12. A chip card according to claim 11, wherein the capacitance element comprises two free ends.

13. A chip card according to claim 11, wherein the capacitance element is connected at one end to an inner winding of the coupler coil and at another end to an outer winding of the booster antenna, two other ends being left unconnected.

14. A chip card according to claim 1, wherein the booster antenna forms an outer coil and both the capacitance element and the coupler coil are located inside the outer coil.

15. A chip card according to claim 1, wherein the booster antenna has a rectangular shape with an upper and a lower parallel long sides and two lateral parallel short sides, the coupler coil being located inside the booster antenna, the coupler coil having an upper and a lower sides parallel to said upper and lower parallel long sides of the booster antenna, and the capacitance element is arranged in an area extending, inside the booster antenna, below the upper long side of the booster antenna and a line parallel to, and at the level of, the lower side of the coupler coil.

16. A chip card according to claim 1, wherein the booster antenna has a rectangular shape with two parallel long sides and two parallel short sides, and the fingers of the capacitance element extend from foot to head in a direction parallel to the long sides of the booster antenna.

17. An antenna support for a chip card according claim 1, comprising a booster antenna and a coupler coil lying on the same main surface of the antenna support.

18. A process for manufacturing an antenna support according to claim 17, wherein
a dielectric support is provided,
a booster antenna and a coupler coil are formed on one main surface of the support, the booster antenna comprising at least one electrically conductive winding extending between a first end and a second end, the coupler coil comprising at least one electrically conductive winding extending between a third end and a fourth end, the third end being connected to the first end of the booster antenna,
a capacitance element is connected to the booster antenna and the coupler coil, the capacitance element comprising at least a first finger and at least a second finger, the first and second fingers extending from a foot to a tip, head-to-foot, alongside each other, the second end of the booster antenna and the fourth end of the coupler coil being connected respectively to one of the first and second fingers.

19. A process according claim 18, wherein the booster antenna, the coupler coil and the capacitance element are comprised of a single continuous electrically conductive wire embedded in the antenna support.

20. A process according claim 18, wherein the booster antenna and the coupler coil are comprised of a continuous electrically conductive wire embedded in the antenna support and the capacitance element comprises a substrate made of a dielectric material with an electrically conductive layer lying on the substrate, the fingers being etched in the electrically conductive layer.

\* \* \* \* \*